US009355321B2

(12) United States Patent
Wujcicki

(10) Patent No.: US 9,355,321 B2
(45) Date of Patent: May 31, 2016

(54) AUTOMATIC DETECTION OF THE NUMBER OF LANES INTO WHICH A ROAD IS DIVIDED

(75) Inventor: Artur Wujcicki, Lodz (PL)

(73) Assignee: TomTom Polska Sp. z o o., Warsaw (PL)

( * ) Notice: Subject to any disclaimer, the term of this patent is extended or adjusted under 35 U.S.C. 154(b) by 0 days.

(21) Appl. No.: 13/824,600

(22) PCT Filed: Sep. 16, 2010

(86) PCT No.: PCT/EP2010/063647
§ 371 (c)(1),
(2), (4) Date: Mar. 18, 2013

(87) PCT Pub. No.: WO2012/034596
PCT Pub. Date: Mar. 22, 2012

(65) Prior Publication Data
US 2013/0182957 A1    Jul. 18, 2013

(51) Int. Cl.
*G06K 9/46* (2006.01)
*G06K 9/00* (2006.01)
*G01C 21/32* (2006.01)
*G01C 21/36* (2006.01)

(52) U.S. Cl.
CPC ............ *G06K 9/00798* (2013.01); *G01C 21/32* (2013.01); *G01C 21/3658* (2013.01); *G06K 9/0063* (2013.01)

(58) Field of Classification Search
None
See application file for complete search history.

(56) References Cited

U.S. PATENT DOCUMENTS

| 6,850,841 | B1 | 2/2005 | Casino | |
|---|---|---|---|---|
| 7,463,974 | B2 * | 12/2008 | Morita | G01C 21/30 340/995.21 |
| 7,561,955 | B2 * | 7/2009 | Kubota | 701/96 |
| 8,477,999 | B2 * | 7/2013 | Nishida et al. | 382/104 |
| 8,612,136 | B2 * | 12/2013 | Levine et al. | 701/408 |
| 2005/0072922 | A1 * | 4/2005 | Moisel et al. | 250/330 |
| 2007/0168113 | A1 | 7/2007 | Litkouhi et al. | |
| 2007/0203617 | A1 * | 8/2007 | Haug | B62D 15/029 701/1 |
| 2008/0027627 | A1 * | 1/2008 | Ikeda et al. | 701/117 |
| 2008/0255724 | A1 * | 10/2008 | Fechner et al. | 701/35 |

(Continued)

FOREIGN PATENT DOCUMENTS

EP    2065835 A2    6/2009

OTHER PUBLICATIONS

Collado J M et al: "Detection and classification of road lanes with a frequency analysis", Intelligent Vehicles Symposium, 2005. Proceedings. IEEE Las Vegas, NV, USA Jun. 6-8, 2005, Piscataway, NJ, USA,IEEE, Piscataway, NJ, USA, Jun. 6, 2005, pp. 78-83, XP010833947.

(Continued)

*Primary Examiner* — Daniel Mariam

(57) ABSTRACT

This invention concerns a computer-implemented method for determining a number of lanes on a road. The method comprises receiving an image, the image being a photographic image of the road or an image derived from the photographic image of the road, carrying out an analysis of the image to identify lane dividers of the road and determining a number of lanes into which the road is divided from the identification of the lane dividers. The method may comprise determining a confidence level for the determined value for the number of lanes. Map data of a plurality of roads may be generated using the value for the number of lanes determined from the computer-implemented method.

13 Claims, 8 Drawing Sheets

(56) References Cited

U.S. PATENT DOCUMENTS

2010/0086174 A1* 4/2010 Kmiecik et al. ............ 382/103
2010/0208937 A1* 8/2010 Kmiecik et al. ............ 382/100
2012/0121183 A1* 5/2012 Joshi ........................... 382/191

OTHER PUBLICATIONS

International Search Report issued Jun. 7, 2011 for International Application No. PCT/EP2010/063647.

* cited by examiner

AUTOMATIC DETECTION OF THE NUMBER OF LANES INTO WHICH A ROAD IS DIVIDED

CROSS-REFERENCES TO RELATED APPLICATIONS

This application is the National Stage of International Application No. PCT/EP2010/063647, filed Sep. 16, 2010 and designating the United States. The entire content of this application is incorporated herein by reference.

FIELD OF THE INVENTION

This invention concerns improvements in or relating to automatic detection of the number of lanes into which a road is divided. The invention has particular application to the automatic detection of the number of lanes into which a road is divided using photographic images of the road or images derived from the photographic images and the generation of map data therefrom.

BACKGROUND OF THE INVENTION

To generate map data for use by navigation devices, such as Portable Navigation Devices (PNDs), it is desirable to determine the number of lanes into which roads are divided (hereinafter referred to as "lane count"). The navigation device is then able to provide accurate information and instructions concerning a route being driven, such as a display of the lane count. The determination of the lane count can be carried out manually. However, such manual identification is slow and involves significant labour costs.

To reduce the time and amount of manual labour required in determining lane count, a method for automatically identifying the lane count is used. One such method analyses data, such as position data, collected from Tom Tom navigation devices in vehicles as the vehicles travel the road (hereinafter referred to as "probe data"). Below is a table of the results of such a method applied to roads where the number of lanes is known.

TABLE 1

| Count of out Out | Ref 2 | 3 | 4 | 5 | Grand Total |
|---|---|---|---|---|---|
| 2 | 3283 | 273 | 5 | | 3561 |
| 3 | 489 | 1037 | 193 | 14 | 1733 |
| 4 | 107 | 311 | 477 | 524 | 1419 |
| 5 | 28 | 513 | 84 | 1 | 626 |
| Grand Total | 3907 | 2134 | 759 | 539 | 7339 |

The table shows the number of roads automatically identified as having a lane count of 2, 3, 4 or 5 from the probe data, denoted "out", against a reference value, denoted "Ref". As can be seen, for the 3907 roads having two lanes, the automatic analysis of the probe data only identifies 3283 roads as having two lanes; the automatic analysis misidentifying other two lane roads as having more lanes. Similar results are obtained for roads having other lane counts. The automatic identification of lane count from probe data is particularly poor for roads with five lanes.

It is desirable to improve the accuracy of the automated lane counting.

SUMMARY OF INVENTION

According to a first aspect of the invention there is provided a computer implemented method for determining a number of lanes on a road comprising receiving an image, the image being a photographic image of the road or an image derived from the photographic image of the road, carrying out an analysis of the image to identify lane dividers of the road and determining a number of lanes into which the road is divided from the identification of the lane dividers.

It has been found that methods in accordance with the invention can identify the number of lanes into which a road is divided more accurately than the automatic analysis of probe data alone.

In one embodiment, the analysis is a spectral analysis. The spectral analysis may comprise searching portions of the image for one or more spectral signatures characteristic of a lane divider. It has been found that a lane divider has a readily identifiable spectral signature allowing lane dividers to be identified from photographic images or images derived from photographic images. The spectral analysis may comprise generating an image frequency spectrum by carrying out a Fourier transform of the image and comparing at least a portion of the image frequency spectrum with one or more spectral signatures characteristic of a lane divider. The comparison may comprise searching for a set of characteristic local maxima within the image frequency spectrum. The comparison may comprise comparing a ratio of frequencies of the local maxima, comparing a magnitude of the local maxima, determining whether one or more of the local maxima are above a predetermined threshold, comparing average values of portions (and possibly the whole) of the spectrum to a magnitude of the local maxima. If one or more or all of these comparisons are found that are characteristic of spectral signatures of a lane divider, a portion of the image is identified as containing a lane divider.

The method may comprise identifying road boundaries in the image and confining a search for lane dividers to a portion of the image within the identified road boundaries. The search for lane dividers may comprise searching for one or more spectral signatures characteristic of a lane divider within the identified road boundaries. Confining the search for lane dividers to be within the road boundaries reduces the amount of processing required and reduces the chance of portions of the image being incorrectly identified as lane dividers.

The method may comprise filtering the image before the spectral analysis to confine the search for lane dividers to one or more portions of the road that are substantially straight in a first (ordinate) direction. For example, the image may be an LRI image localised along a centreline of the road and the search may be confined to one or more portions of the image between two road boundaries that, for a plurality of possible road boundaries, have the two smallest variances in a second (abscissa) direction over minimum length in the first direction.

The analysis may comprise dividing the image into columns extending in the first ordinate direction and comparing an image spectrum of each column to a signature characteristic of a lane divider. Columns whose image spectrum comprises elements the same or substantially similar to the signature characteristic of a lane divider are identified as comprising a lane divider.

The analysis of the image may comprise determining a width of the lanes from the elements of the image identified lane dividers. The method may comprise rejecting as a lane a space between two identified lane dividers if the space has a width above a predetermined upper width threshold or below a predetermined lower width threshold. The predetermined upper width threshold may be between 3 to 5 meters, and preferably 4 meters, and the predetermined lower width threshold may be between 0.5 to 2 meters, and preferably 1.5 meters.

The method may comprise determining a confidence level for the determined number of lanes (lane count). The method may comprise rejecting the lane count if the determined confidence level is below a predetermined confidence threshold. In this way, an indication is provided of any poor results allowing such poor results to be removed when utilizing the data.

The method may comprise determined the lane count from features derived from the image and features derived from received probe data.

The method may comprise dividing the image into a number of sub-images and carrying out the analysis on the sub-images. This may increase the reliability of the lane count as the lane count of a road may vary over large distances.

According to a second aspect of the invention there is provided a processing device arranged to carry out the method of the first aspect of the invention.

According to a third aspect of the invention there is provided a data carrier having stored thereon instructions, which, when executed by a processor cause the processor to execute a method according to the first aspect of the invention.

According to a fourth aspect of the invention there is provided a method of generating map data of a plurality of roads comprising determining a number of lanes on one or more of the roads using the method of the first aspect of the invention and generating map data identifying the number of lanes.

BRIEF DESCRIPTION OF THE FIGURES

There now follows, by way of example only, a detailed description of embodiments of the present invention with reference to the accompanying drawings, in which:—

DETAILED DESCRIPTION OF THE FIGURES

Figure 1:
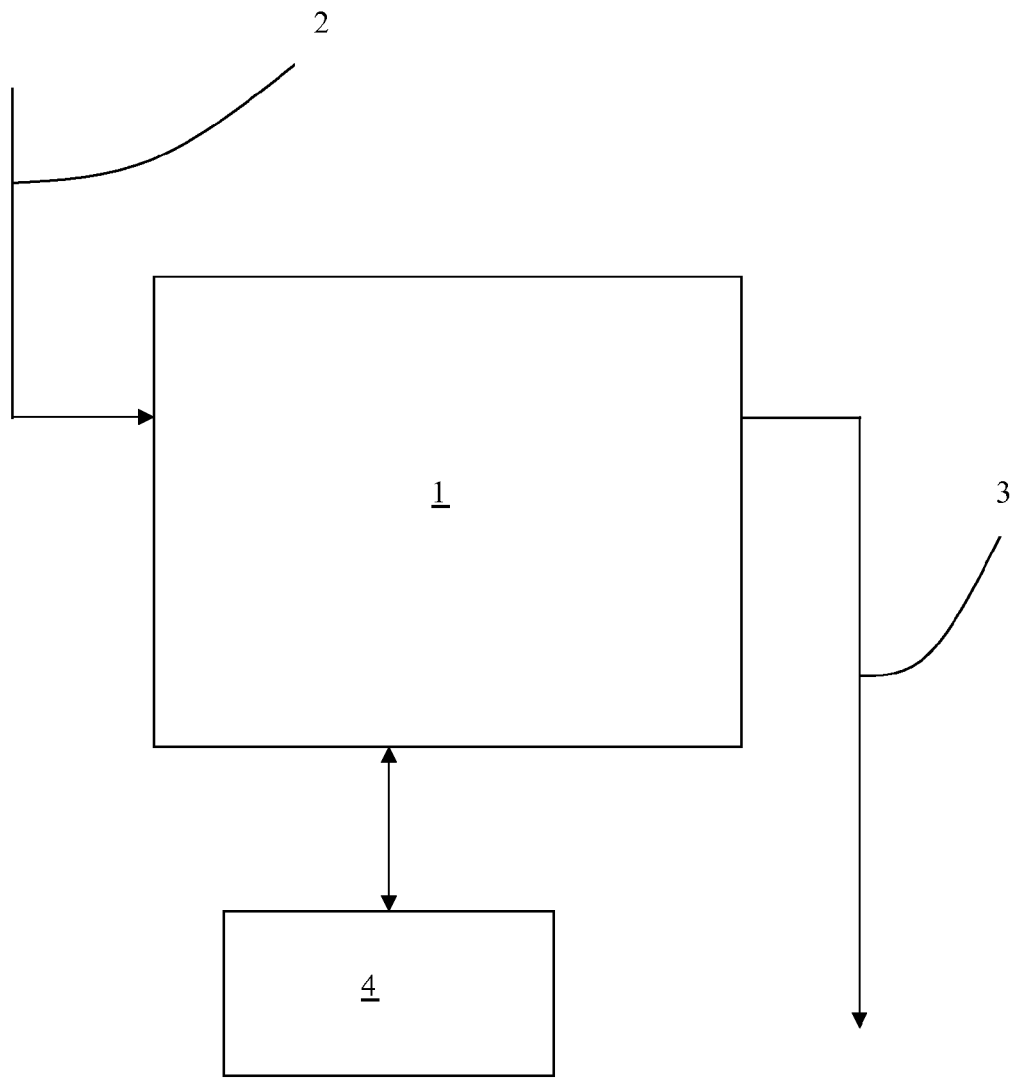
FIG. 1 is a schematic view of a processing device according to the invention.

Referring to FIG. 1 there is shown apparatus according to an embodiment of the invention. The apparatus comprises a processor 1 having an input 2 and an output 3. The processor 1 is connected with memory 4 that has instructions stored therein, which, when executed by a processor 1 cause the processor 1 to execute the method for determining a number of lanes on a road, as described below.

Figure 2:
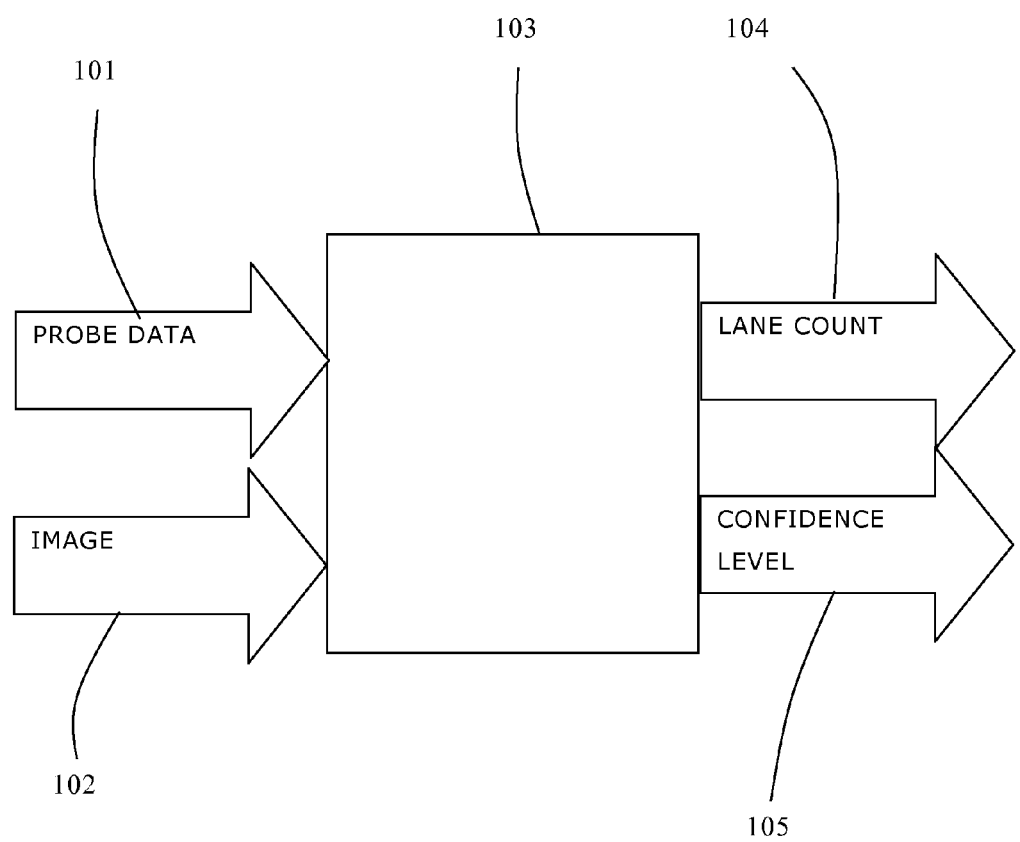
FIG. 2 shows processing blocks according to an embodiment of the invention.

Now referring to FIG. 2, the method comprises receiving as an input probe data, 101, relating to a road and an LRI 13 image, derived from an aerial photographic image, 102, of the road. The aerial image 102 may be obtained by any suitable means, such as from an aircraft or satellite and the conversion to an LRI 13 image is carried out using conventional methods. An analysis 103 of the image 102 is carried out to identify lane dividers of the road and determine a number of lanes (lane count) 104 into which the road is divided from the identified of lane dividers. In this embodiment, the analysis also comprises determining a confidence level 105 for the lane count 104. The lane count 104 and confidence level 105 are output to a suitable resource, as required, for example to memory 4 or to a mass storage device. The lane count and confidence level can be used in the generation of map data for navigation devices.

Figure 3:
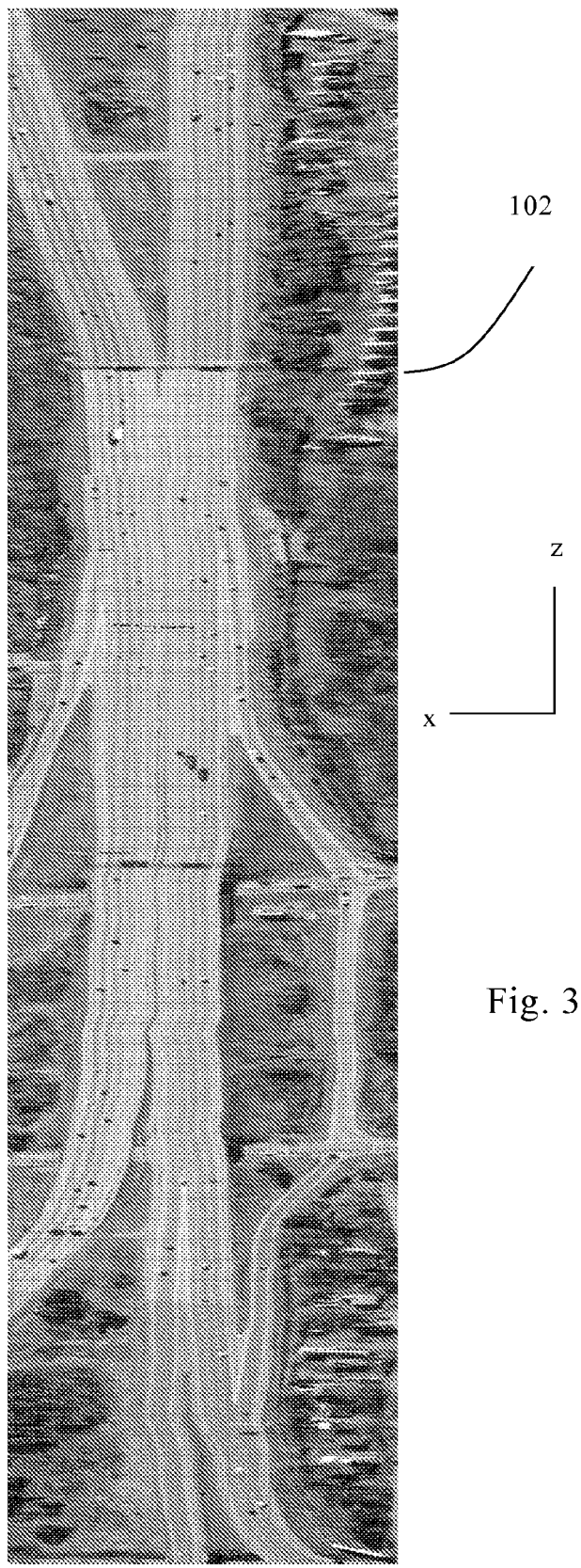
FIG. 3 is an example of image data used in the method of the invention.

FIG. 3 shows an example of the LRI 13 image that may be analysed to determine lane count. This image is a Linearly Referenced Image (LRI) in which features are localised by a measure along a linear element, in this embodiment, along a road centreline.

Figure 4:
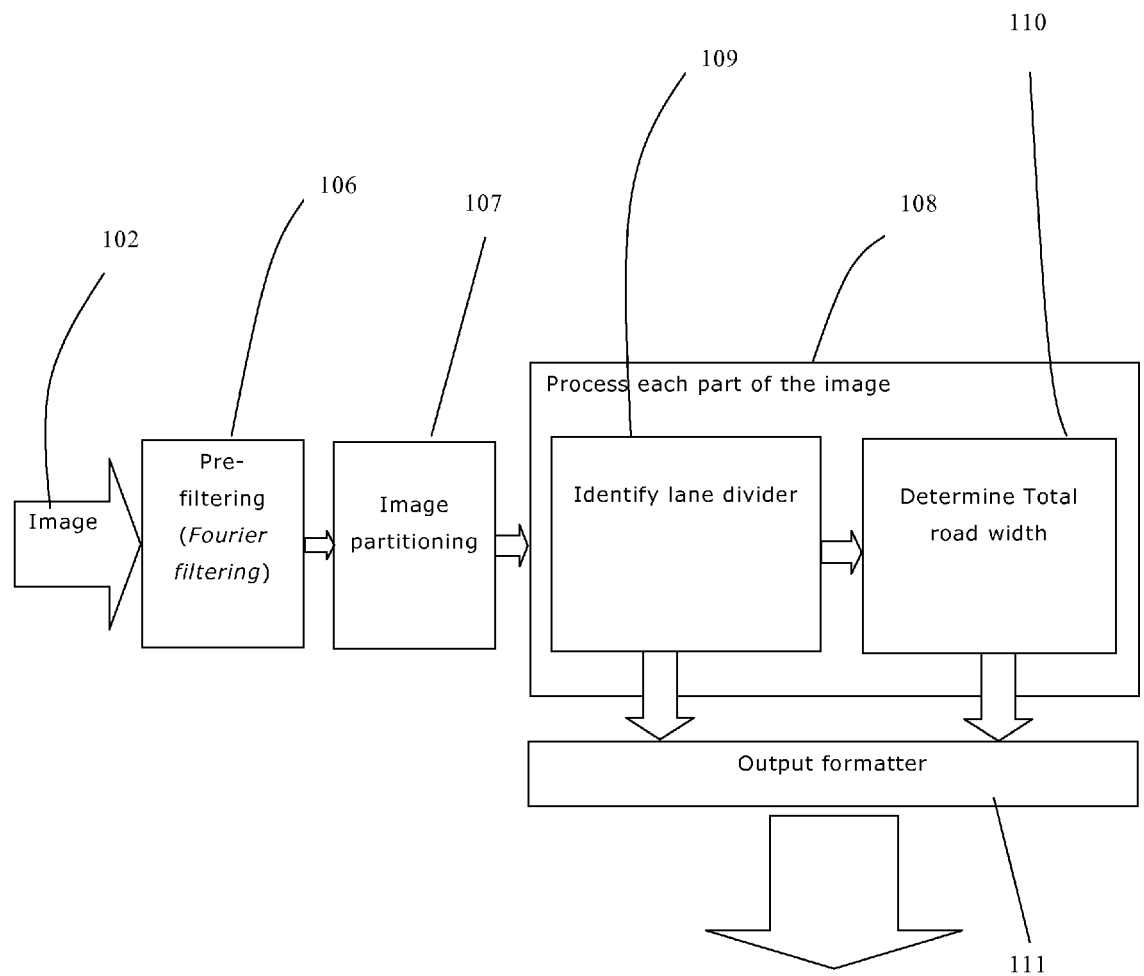
FIG. 4 shows more detail of the processing blocks according to the embodiment of the invention.

FIG. 4 shows more details of the analysis carried out on the image 102. In a first step 106, the image 102 is filtered in the Fourier domain using standard techniques to remove roads that do not extend in a first, ordinate direction, Z. The large image is then sectioned in the ordinate direction into smaller sub-images. For example, for a 512×2048 LRI image, it is suitable to section the image into 16 sub-images 512×128. However, it will be understood that a different amount of sub-images may be used and that other sized LRI images may be suitable for analysis such as 768×1600 LRI images.

Each sub-image is then processed in block 108 to identify lane dividers in the sub-image and the total width of the road.

In block 109, lane dividers are identified by first generating road boundaries through conventional morphological operations, filtering and segmentation. Road boundaries are the two possible road boundaries that, for a plurality of possible road boundaries, have the two smallest variances in the abscissa direction over a minimum distance in the ordinate direction, Z. In this embodiment, the minimal distance is 100 pixels of the sub-image. For example, for candidate road boundaries may be identified having variances over 100 pixels of 0.98, 0.02. 0.032 and 0.23. The candidate road boundaries having the two smallest variances of 0.02 and 0.032 are identified as the road boundaries within which the search for lane dividers is confined.

Figure 5:
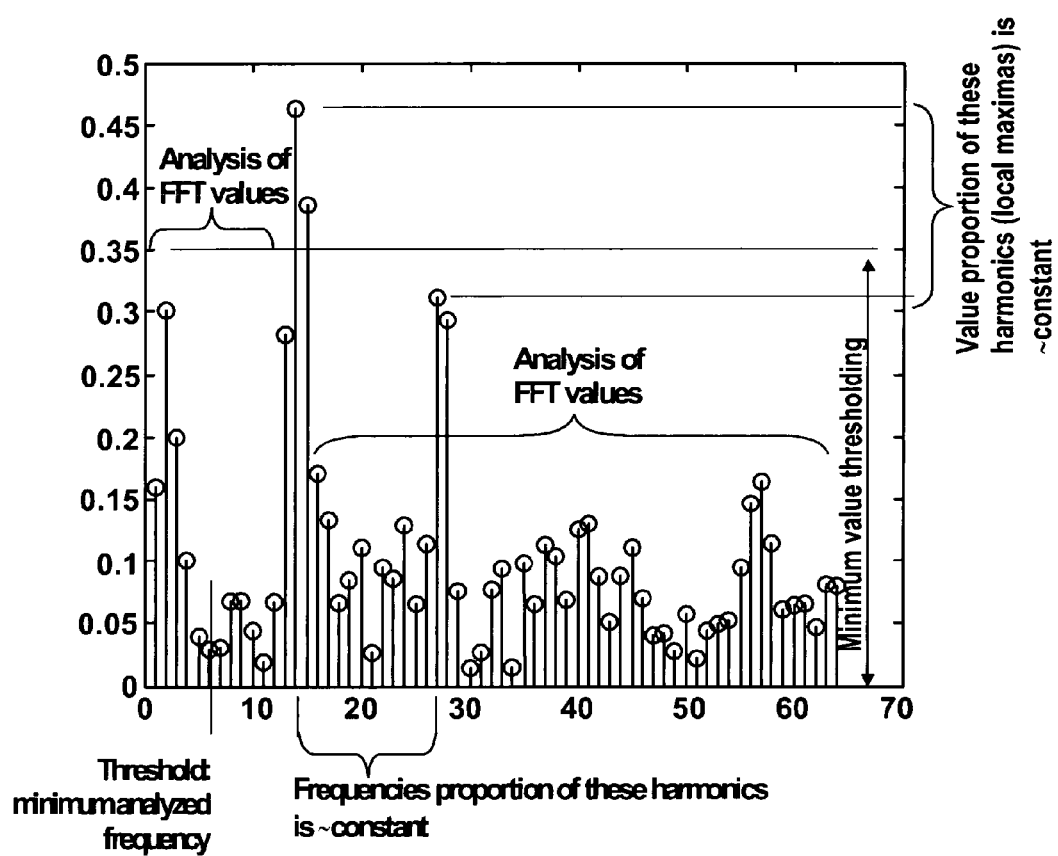
FIG. 5 is an example of a spectral signatures characteristic of a lane divider.

The search for lane dividers is confined to the one or more portions of the sub-image that are within the road boundaries. A spectral analysis is then carried out on these portions of the sub-image to identify lane dividers. In this embodiment, the sub-image is divided along the abscissa direction into columns that extend in the ordinate direction. A Fourier transform of each column is then compared to spectral signatures characteristic of a lane divider. Columns whose image spectrum comprises elements the same or substantially similar to the spectral signatures characteristic of a lane divider are identified as comprising a lane divider. A characteristic frequency spectrum of a lane divider is shown in FIG. 5. In this embodiment, the following characteristics are searched for:

1. That the first maximum is located above a minimum frequency, in this embodiment 5.
2. That the ratio of the local maxima, in this embodiment the first local maxima to the second local maxima, is within a predefined range, in this embodiment between 1.8 and 2.2.
3. That the magnitude of the at least one of the local maxima, in this embodiment the first local maxima, is above a predetermined threshold, in this embodiment above 0.35.

4. That the ratio of the values of the local maxima, in this embodiment the first local maxima to the second local maxima, is within a predetermined range, in this embodiment, between 1.05 and 2.5.

5. The average value (in this embodiment, the median value) of the frequencies above the second local maxima should be less than the magnitude of the second local maxima.

6. The average value (in this embodiment, the median value) of the frequencies below the first local maxima should be less than a predetermined proportion of the magnitude of the first local maxima, in this embodiment less than half of the magnitude of the first local maxima.

Columns comprising these spectral characteristics are identified as comprising a lane divider.

Figure 6:
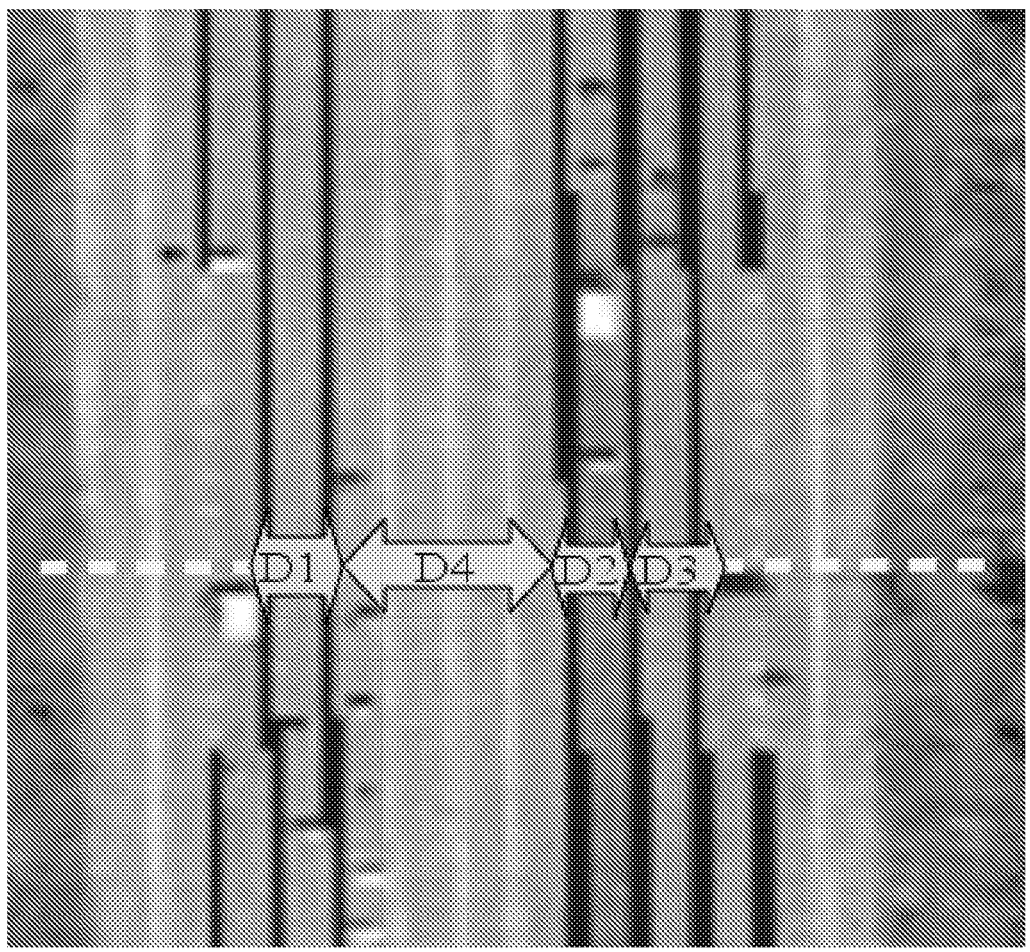
FIG. 6 is a an example of a sub-image that has been analysed to identify lane dividers, the sub-image illustrating the portions of the image identified as comprising lane dividers.

The results of the analysis of block 109 are passed to block 110 wherein a width of the lanes is determined from the identified lane dividers. In this embodiment, the width of the road is determined in pixels and then using data supplied with the LRI 13 image, the pixels are converted in to meters. FIG. 6 illustrates such a process, showing an image wherein portions of the image have been identified as comprising lane dividers. In this example, widths D1 to D4 of the lanes are measured. These distances are then compared to a predetermined upper width threshold, in this embodiment 4 meters, and lower width threshold, in this embodiment 1.5 meters. Lanes having widths that fall outside these thresholds are rejected. In the example shown in FIG. 6, lane D4 is filtered out because it has a width over 4 meters. The total width of the road is then calculated from the remaining widths, for FIG. 6 D1+D2+D3.

Figure 7:
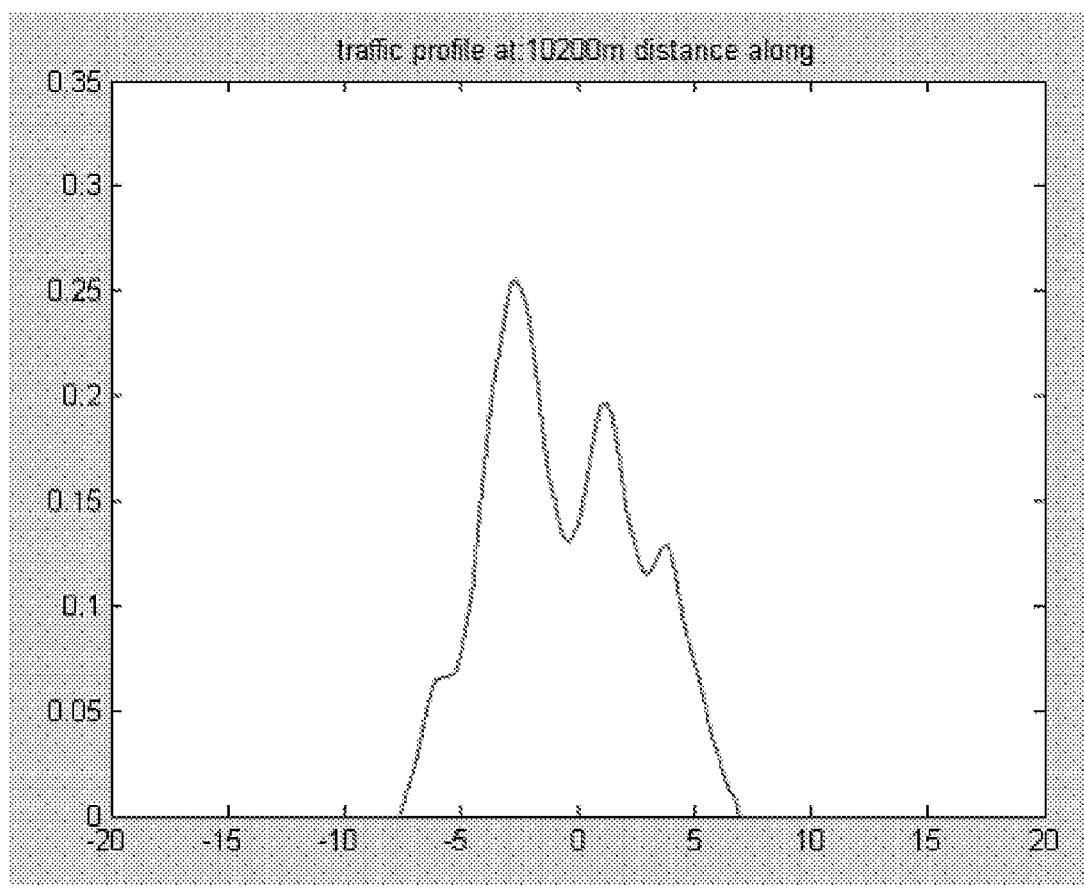
FIG. 7 is a histogram showing an example of probe data received from vehicles.

The features determined from the image are then combined with features determined from the probe data, an example of such data being shown in FIG. 7, via the following equation to give a combined lane count, y:

$$y=(Ax_1+Bx_2+Cx_3+Dx_4+Ex_5+Fx_6+Gx_7+Hx_8+Ix_9+Jx_{10}+Kx_{11}+Lx_{12}+Mx_{13})\times N+O, \quad (1)$$

where:
$x_1$ is the lane count obtained from the probe data
$x_2$ is the road width calculated from the probe data
$x_3$ is image lane count obtained from the probe data×average distance between histogram peaks of the probe data
$x_4$ is peak magnitude of the histogram of the probe data. This peak is measured as the distance between the peak and the valley near to this peak.
If there are several peaks, an average value for all peaks is determined.
$x_5$ is lane count from the probe data
$x_6$ is a width of the histogram for the probe data
$x_7$ is the standard deviation for the probe data
$x_8$ is the width of the probe data that contains 68 percent of the samples
$x_9$ is the width of the probe data that contains 95 percent of the samples
$x_{10}$ is the distance to the left road border from the road centreline as determined from the probe data
$x_{11}$ is the distance to the right road border from the road centreline as determined from the probe data
$x_{12}$ is the number of lane dividers determined from the image
$x_{13}$ is the total width (road width) between the dividers as determined from the image The values of constants A to O have been determined from an optimization procedure that minimizes the error between a computed lane count and a known lane count for a particular set of "training" roads. However, it will be understood that other values may be used, such as more or less accurate values. However, in this embodiment, the following values are used:

A=−0.081177398
B=0.191450131
C=0.015670102
D=−1.461469312
E=7.16335×10$^{-5}$
F=0.004279486
G=0.474283555
H=−0.077535198
I=0.372897898
J=0.400163453
K=−0.360302749
L=−0.012281159
M=0.100657595
N=1.3613
O=−0.968

The value of y may be between 1.5 and 5.5 and the actual lane count for a road is determined by determining the nearest neighbouring integer 1, 2, 3, 4 or 5 for the value y.

Figure 8:
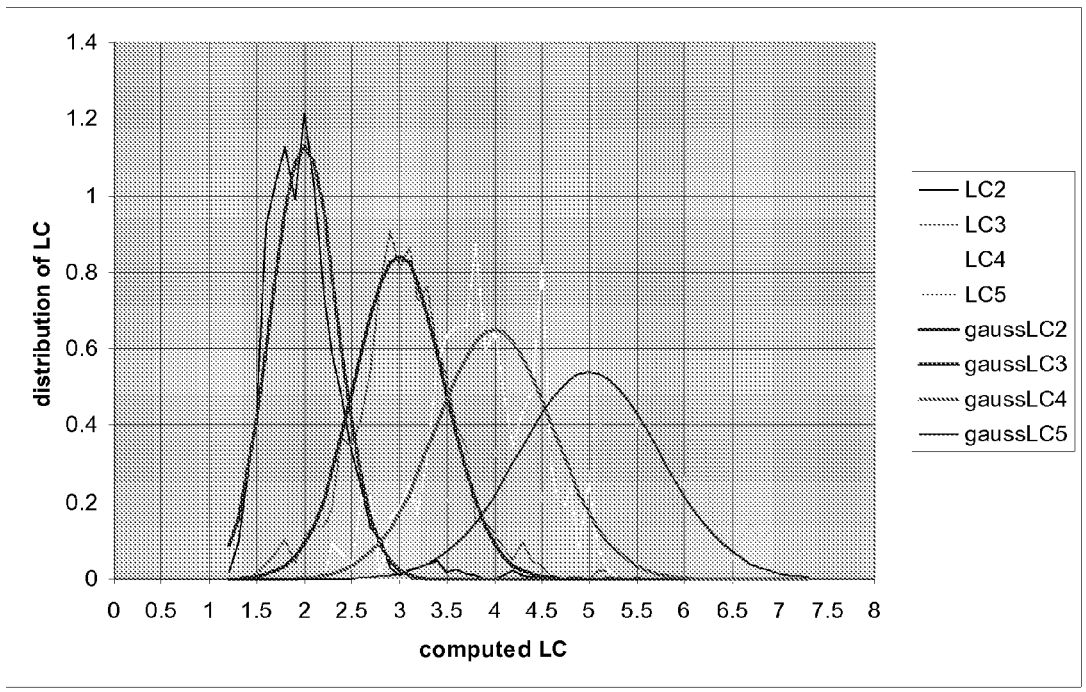
FIG. 8 is a graph illustrating data collected from an image for a number of road segments and the fitting of a modeled distribution to this data for each lane count occurrence.

An example of a distribution of the values of y determined for multiple road segments is shown in FIG. 8 as LC2, LC3, LC4 and LC5. These lane counts have been normalized such that the area under each curve is equal to 1. As can be seen from the normal distributions gaussLC2, guassLC3, guassLC4 and guassLC5 superimposed over the top of the curves LC2 to LC5, the values of y distribute in accordance with a normal distribution.

A confidence level function has been determined from which a confidence level can be attributed to any given value y. This confidence level function is given by:

$$\text{confidence\_level}(y) = \frac{\max\{N(i, \sigma_i) i \in \langle 1, 6 \rangle\}}{\sum_{i=1}^{6} N(i, \sigma_i)}, \quad (2)$$

where,
$N(i,\sigma_i)$ is a normal distribution with a standard deviation as follows:

| I | Standard deviation, $\sigma_I$, for normal distribution |
|---|---|
| 1 | 0.2211 |
| 2 | 0.353760415 |
| 3 | 0.473836897 |
| 4 | 0.612777773 |
| 5 | 0.7391 |
| 6 | 0.8686 |

Figure 9:
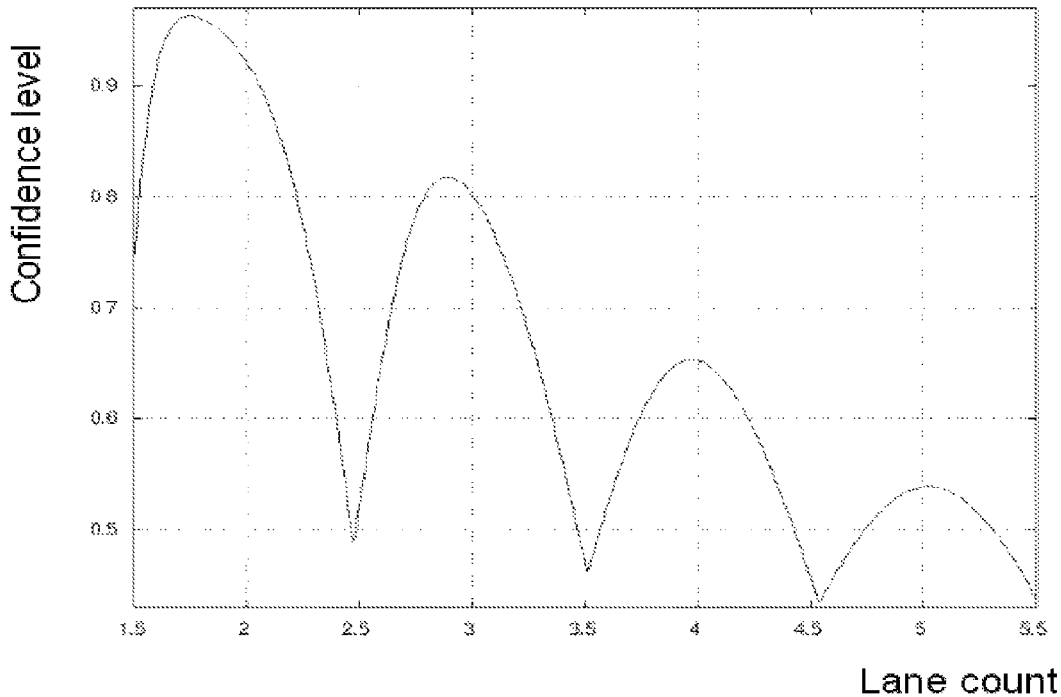
FIG. 9 is a graph of a confidence level function used to determine a confidence level

FIG. 9 is a graph showing the confidence level function. Accordingly, for each value of y a confidence level can be generated from the function. The confidence level and actual lane count are output by the processor to an appropriate resource, such as memory, as appropriate.

It has been found that a method in accordance with this embodiment of the invention can identify the number of lanes into which a road is divided more accurately than the automatic analysis of probe data alone. This is illustrated by the following table of a reference lane count (for the same set of roads used for table 1) versus lane count extracted from probe data and LRI images using the above-described method.

TABLE 2

| Count of out out | ref 2 | 3 | 4 | 5 | Grand Total |
|---|---|---|---|---|---|
| 2 | 3546 | 303 | 14 | | 3863 |
| 3 | 306 | 1450 | 182 | 25 | 1963 |
| 4 | 40 | 363 | 450 | 167 | 1020 |
| 5 | 15 | 18 | 113 | 347 | 493 |
| Grand Total | 3907 | 2134 | 759 | 539 | 7339 |

As can be seen, the number of correct lane counts has increased relative to using the probe data alone, the results of which are shown in table 1. Adding the results of lane count extracted from the LRI 13 image improved detection level by 13.5% (from 65.4% to 78.9%)

The results of the method can be used for the generation of map data, which may be used in navigation devices. In particular, the calculated confidence level may be used to decide whether the lane count automatically determined by the method should be used, for example in map data, or whether a further source of lane count should be consulted to determine lane count for a particular road.

It will be understood that modifications and alterations can be made to the above described embodiment without departing from the invention as defined in the claims.

Furthermore, the value, y, may be determined using more or fewer arguments with corresponding adjustments to the constants.

The lane count may be determined without determination of a confidence level.

The invention claimed is:

1. A computer-implemented method for determining a number of lanes on a road comprising:
   receiving an image, the image being a photographic image of the road or an image derived from the photographic image of the road,
   carrying out an analysis of the image to identify lane dividers of the road,
   receiving probe data, the probe data comprising position data collected from vehicles travelling along the road,
   determining a combined lane count from the identification of the lane dividers from the analysis of the image and from features derived from an analysis of the probe data,
   determining a confidence level for the determined combined lane count according to a confidence level function, and
   determining, from the combined lane count, a number of lanes into which the road is divided.

2. The computer-implemented method according to claim 1, wherein the analysis comprises searching portions of the image for one or more spectral signatures characteristic of a lane divider.

3. The computer-implemented method according to claim 2, wherein the spectral analysis comprises generating an image frequency spectrum by carrying out a Fourier transform of the image and comparing the image frequency spectrum with spectral signatures characteristic of the lane divider.

4. The computer-implemented method according to claim 3, wherein the comparing step comprises searching for a set of characteristic local maxima within the image frequency spectrum.

5. The computer-implemented method according to claim 1, comprising identifying road boundaries in the image and confining a search for lane dividers to a portion of the image within the identified road boundaries.

6. The computer-implemented method according to claim 1, wherein the analysis comprises dividing the image into columns extending in the first, ordinate direction, comparing an image spectrum of each column to a signature characteristic of a lane divider and identifying columns whose image spectrum comprises elements the same or substantially similar to the signature characteristic of a lane divider as comprising a lane divider.

7. The computer-implemented method according to claim 1, wherein the analysis of the image comprises determining a width of the lanes from the elements of the image identified as lane dividers.

8. The computer-implemented method according to claim 7, comprising rejecting as a lane a space between two identified lane dividers if the space has a width above a predetermined upper width threshold or below a predetermined lower width threshold.

9. The computer-implemented method according to claim 1, comprising rejecting the combined lane count if the determined confidence level is below a predetermined confidence threshold.

10. The computer-implemented method according to claim 1, further comprising generating and storing map data for the road identifying the determined number of lanes.

11. The computer-implemented method according to claim 1, further comprising:
    providing navigation information by a navigation device, said information including the determined number of lanes.

12. A non-transitory computer readable medium having stored thereon instructions, which, when executed by a processor cause the processor to execute a method for determining a number of lanes on a road, comprising:
    receiving an image, the image being a photographic image of the road or an image derived from the photographic image of the road,
    carrying out an analysis of the image to identify lane dividers of the road,
    receiving probe data, the probe data comprising position data collected from vehicles travelling along the road,
    determining a combined lane count from the identification of the lane dividers from the analysis of the image and from features derived from an analysis of the probe data,
    determining a confidence level for the determined combined lane count according to a confidence level function, and
    determining, from the combined lane count, a number of lanes into which the road is divided.

13. The non-transitory computer readable medium of claim 12, wherein the method for determining a number of lanes on a road further comprises:
    providing navigation information by a navigation device, said information including the determined number of lanes.

* * * * *